US012754345B2

(12) United States Patent
Hassani

(10) Patent No.: US 12,754,345 B2
(45) Date of Patent: Oct. 6, 2026

(54) METHODS, AND UNMANNED AERIAL SYSTEMS FOR OBTAINING METEOROLOGICAL DATA

(71) Applicant: Alveo AB, Stockholm (SE)

(72) Inventor: Danial Hassani, Alta (SE)

(73) Assignee: Alveo AB, Stockholm (SE)

( * ) Notice: Subject to any disclaimer, the term of this patent is extended or adjusted under 35 U.S.C. 154(b) by 196 days.

(21) Appl. No.: 18/847,756

(22) PCT Filed: Mar. 23, 2023

(86) PCT No.: PCT/SE2023/050259
§ 371 (c)(1),
(2) Date: Sep. 17, 2024

(87) PCT Pub. No.: WO2023/182921
PCT Pub. Date: Sep. 28, 2023

(65) Prior Publication Data

US 2025/0199198 A1 Jun. 19, 2025

(30) Foreign Application Priority Data

Mar. 24, 2022 (SE) .................................... 2250366-8

(51) Int. Cl.
*G01W 1/08* (2006.01)
*G05D 1/606* (2024.01)
(Continued)

(52) U.S. Cl.
CPC .............. *G01W 1/08* (2013.01); *G05D 1/606* (2024.01); *G05D 1/646* (2024.01); *G05D 1/678* (2024.01);
(Continued)

(58) Field of Classification Search
CPC ........... G01W 1/08; G01W 1/10; G01W 1/02; G05D 1/606; G05D 1/646; G05D 1/678;
(Continued)

(56) References Cited

U.S. PATENT DOCUMENTS

| | | | | |
|---|---|---|---|---|
| 10,223,924 | B2 | 3/2019 | Wang et al. | |
| 2018/0239369 | A1 | 8/2018 | Fisher et al. | |
| 2019/0154874 | A1 * | 5/2019 | Shams ...................... | B64C 3/54 |

FOREIGN PATENT DOCUMENTS

| | | | |
|---|---|---|---|
| CN | 108871371 | A | 11/2018 |
| EP | 2525243 | A1 | 11/2012 |

(Continued)

OTHER PUBLICATIONS

Djamali Khelif et al., "Measurements of Air-Sea Fluxes with a Controlled Towed Vehicle (CTV) Controlled Towed Vehicle (CTV)", Mar. 22, 2010, Retrieved from the Internet: URL: http://www.unols.org/sites/default/files/201002scoap_09.pdf; retrieved on Mar. 16, 2016, pp. 8, 10, 13.

*Primary Examiner* — Yuen Wong
(74) *Attorney, Agent, or Firm* — Tucker Ellis LLP

(57) ABSTRACT

Disclosed is a method for obtaining meteorological data by a UAS, the UAS including at least one UAV, a control center and a wireless communication interface. The UAV is equipped with a meteorological data sensor and a flight controller. The method includes the control center sending flight instruction data to the UAV, and performing flight. The UAV collects raw meteorological data and flight data and transmits the collected raw meteorological data and the flight data in real time to the control center, the flight data being collected by any one of a position sensor, a motion sensor, an environment sensor and/or a combination thereof included in the flight controller. The control center calculates meteorological data based on the received raw meteorologi-
(Continued)

cal data and the flight data and sends return instruction data. The at least one UAV returns to the UAS accordingly.

12 Claims, 6 Drawing Sheets

(51) Int. Cl.

| | |
|---|---|
| ***G05D 1/646*** | (2024.01) |
| ***G05D 1/678*** | (2024.01) |
| ***H04W 4/44*** | (2018.01) |
| *G05D 105/80* | (2024.01) |
| *G05D 109/22* | (2024.01) |
| *G05D 111/30* | (2024.01) |

(52) U.S. Cl.
CPC .......... *H04W 4/44* (2018.02); *G05D 2105/80* (2024.01); *G05D 2109/23* (2024.01); *G05D 2111/32* (2024.01)

(58) Field of Classification Search
CPC ........... G05D 2105/80; G05D 2109/23; G05D 2111/32; G05D 3/00; H04W 4/44; B64C 13/18; B64C 29/00; B64D 47/08; B64F 1/222; G01C 23/00; B64U 10/00; B64U 2101/35; G06Q 10/08
See application file for complete search history.

(56) References Cited

FOREIGN PATENT DOCUMENTS

| | | | |
|---|---|---|---|
| JP | 2020153792 | A | 9/2020 |
| KR | 20180119729 | A | 11/2018 |
| KR | 102193905 | B1 | 12/2020 |
| SE | 538733 | C2 | 11/2016 |

* cited by examiner

METHODS, AND UNMANNED AERIAL SYSTEMS FOR OBTAINING METEOROLOGICAL DATA

This application is a national stage of International Application No. PCT/SE2023/050259, filed Mar. 23, 2023, which claims priority of Sweden Application No. 2250366-8, filed Mar. 24, 2022.

TECHNICAL FIELD

The present disclosure relates generally to methods and unmanned aerial systems for obtaining meteorological data.

BACKGROUND

Wind power is an important part of the future 100% renewable energy mix. In 2018, the global wind power installed capacity was 565 GW (542 GW onshore wind and 23 GW offshore wind). It is foreseen that by 2050, this number will grow by 970% to 6044 GW (5044 GW onshore wind and 1000 GW offshore wind), enough to cover 35% of the global electricity generation mix. By 2050, the accelerated deployment of wind power can contribute to avoided emissions of up to 6.3 gigaton $CO_2$ per year, according to "Future of wind, Deployment, investment, technology, grid integration and socio-economic aspects", International Renewable Energy Agency, October 2019. As described, wind power is an integral part of today's and the future's global sustainable electricity supply and economy.

In order to construct new wind farms, prospective wind farm sites are chosen. To evaluate the wind energy potential of a prospective wind farm sufficiently, on-site weather monitoring equipment, especially wind property monitoring equipment must be used for at least one year.

Currently, meteorological masts, met masts for short, are used for on-site weather monitoring at prospective wind farm sites. Met masts are the current industry standard. Referring to FIG. 1, a met mast 110 comprises of several sensors and anemometers 120 located in different heights on a self-supporting or guyed steel lattice tower. The met mast 110 is onshore in FIG. 1, that is on the ground 160. The met mast 110 can also be located/installed offshore, that is in the water 150. The met mast 110 structure is typically between 30 to 160 meters in height and is built and transported in several sections. The weight of the whole structure can be up to 50 metric tons, while in an offshore setting it can typically reach to more than 100 tons of steel. The offshore met mast is usually supported by a concrete foundation can weight as much as 2000 tons depending on the water depth. The huge weight of a met mast makes it difficult to transport and install.

Besides the enormous weight, the met mast is quite expensive. Met masts are typically installed with several kilometers distance from each other. A 100-meter onshore met mast costs approximately €73,000 to €118,000 to buy and install, and an extra permit fee is also needed. An offshore met mast costs on average around € 10-12 million to procure and install. The maintenance of a met mast is also expensive.

Besides the met mast, remote sensing (RS) devices can also be used on a prospective wind farm. Referring to FIG. 1, RS devices collect/record wind characteristics in a large area by means of either light detection and ranging (LiDAR) 130 or sound/sonic detection and ranging (SoDAR) 140. The LiDAR 130 is a device that works based on laser technology, and measures the backscattered light from the atmosphere to determine atmospheric conditions. The SoDAR 140 is a wind profiling technology which works by measuring the scattering of sound waves or acoustic signals by atmospheric turbulence. The RS devices can be installed both onshore and offshore.

Even though RS devices are significantly cheaper than installing and maintaining a met mast, they cannot be used to measure some of the critical parameters of the wind such as humidity, pressure, and temperature. Moreover, the measurement uncertainty of RS devices is usually considered to be lower than met masts. Therefore, RS devices are rarely used as standalone wind measurement solutions. In other words, using only RS devices can not necessarily ensure a bankable dataset for prospective wind farms. As the result, RS devices are most often used in combination with met masts for reducing data uncertainty.

The use of RS devices in combination with met masts can lower the costs of the whole wind/weather monitoring system to some degree since the developers could install fewer met masts at the prospective project site.

In addition, due to met masts being massive and bulky structures, special equipment and considerable manpower is needed to install, maintain, and finally dismantle them. In an offshore environment, this will be a much bigger issue since large vessels and cranes are needed to install/dismantle each met mast. Offshore met masts need heavy support structures, while onshore met masts need foundations and land preparation. Moreover, each mast needs to be designed and manufactured according to the environmental restrictions prior to installation, which makes the whole process more complex, expensive, and time consuming.

Since there will be only a few met masts for each prospective wind farm, certain intermediate wind characteristics are estimated by using mathematical models and extrapolation, which increases the uncertainty of the recorded dataset. The complementary usage of RS devices can partly reduce this issue. However, these devices can only partly help since they are not able to record some parameters such as temperature, atmospheric pressure, and humidity.

Moreover, anemometers used in met masts are subject to occasional over-speeding and freezing which will lower the accuracy and reliability of data collection. RS devices are also subject to being buried in snow and data inaccuracies during rain and fog which further hampers their ability to gather reliable data.

Furthermore, met masts are required to be installed on a foundation in general. Concrete, hammered monopile, or even jacket structures of the foundation all have considerable environmental impacts for offshore locations. Aside from the lifecycle carbon footprint of using large amounts of steel and concrete in such foundations and the met mast structure itself, the installation poses damage to the environment.

Therefore, there is a need for an autonomous, economical, flexible, and accurate meteorological data obtaining system, which is easy to install and maintain, and has less negative impact on the environment. Such meteorological data comprises wind property data and other weather-related data.

Besides prospective wind farms, there are other sites or occasions which also need such autonomous meteorological data obtaining system, e.g., real-time monitoring of aeroallergens or other atmospheric aerosols/particulates, measurements of pollution and greenhouse gas concentration, monitoring of ocean, seas and coastal waters, biodiversity and bio-based economy observations, etc.

SUMMARY

It is an object of the invention to address at least some of the problems and issues outlined above. It is an object of embodiments of the invention to provide an economical, flexible, accurate and environmentally friendly meteorological data obtaining method and system. It is an object of embodiments of the invention to obtain accurate and complete meteorological data. It is possible to achieve these objects and others by using methods and system as defined in the attached independent claims.

According to one aspect, a method is provided for obtaining meteorological data by an unmanned aerial system, UAS. The UAS comprises at least one unmanned aerial vehicle, UAV, a control center and a wireless communication interface. The at least one UAV is equipped with a meteorological data sensor and a flight controller, FC. The at least one UAV is configured for wireless communication with the control center via the wireless communication interface during flight. The method comprises sending flight instruction data, from the control center to the at least one UAV, instructing the at least one UAV to perform flight. The method further comprises performing flight, by the at least one UAV, according to the flight instruction data and collecting raw meteorological data and flight data, by the at least one UAV during the flight, wherein the raw meteorological data is collected by the meteorological data sensor and the flight data is collected by the FC, wherein the flight data being collected by any one of a position sensor, a motion sensor, an environment sensor and/or a combination thereof included in the FC. The method further comprises transmitting, in real time, the collected raw meteorological data and the flight data, from the at least one UAV to the control center, during the flight, via the wireless communication interface of the UAS. The method further comprises calculating meteorological data, in the control center, based on the received raw meteorological data and the flight data in the transmitting step. The method further comprises sending return instruction data, from the control center to the at least one UAV, instructing the at least one UAV to return to the UAS. The method further comprises returning the at least one UAV to the UAS, according to the return instruction data.

According to another aspect, an unmanned aerial system, UAS, for obtaining meteorological data. The UAS comprises at least one unmanned aerial vehicle, UAV, a control center and a wireless communication interface. The at least one UAV is equipped with at least one meteorological data sensor and a flight controller, FC. The at least one UAV is arranged for wireless communication with the control center via the wireless communication interface during flight. The control center and the FC of the at least one UAV comprise instructions which when executed cause the system to: send flight instruction data, from the control center to the at least one UAV, instructing the at least one UAV to perform flight. The system is further caused to perform flight, by the at least one UAV, according to the flight instruction data and collect raw meteorological data and flight data, by the at least one UAV during the flight, wherein the raw meteorological data is collected by the meteorological data sensor, and the flight data is collected by the FC, wherein the flight data being collected by any one of a position sensor, a motion sensor, an environment sensor and/or a combination thereof included in the FC. The system is further caused to transmit, in real time, the collected raw meteorological data and the flight data, from the at least one UAV to the control center, during the flight, via the wireless communication interface of the UAS. The system is further caused to calculate meteorological data, in the control center, based on the received raw meteorological data and the flight data. The system is further caused to send return instruction data, from the control center to the at least one UAV, instructing the at least one UAV to return to the UAS. The system is further caused to return the at least one UAV to the UAS, according to the return instruction data.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

An unmanned aerial vehicle (UAV) is an aircraft without a human pilot, crew, or passengers on board. UAVs are also more commonly known as drones. UAVs are usually a component of an unmanned aerial system (UAS). The UAS can be an autonomous system which also includes a ground-based controller and a communication system communicating with the UAV. Since the UAV is flexible, environmentally friendly, cheap, easily deployable and accurate, the UAV and UAS are suitable for obtaining meteorological data in an onshore or offshore prospective wind farm, or other sites which need meteorological data acquisition.

Figure 1:
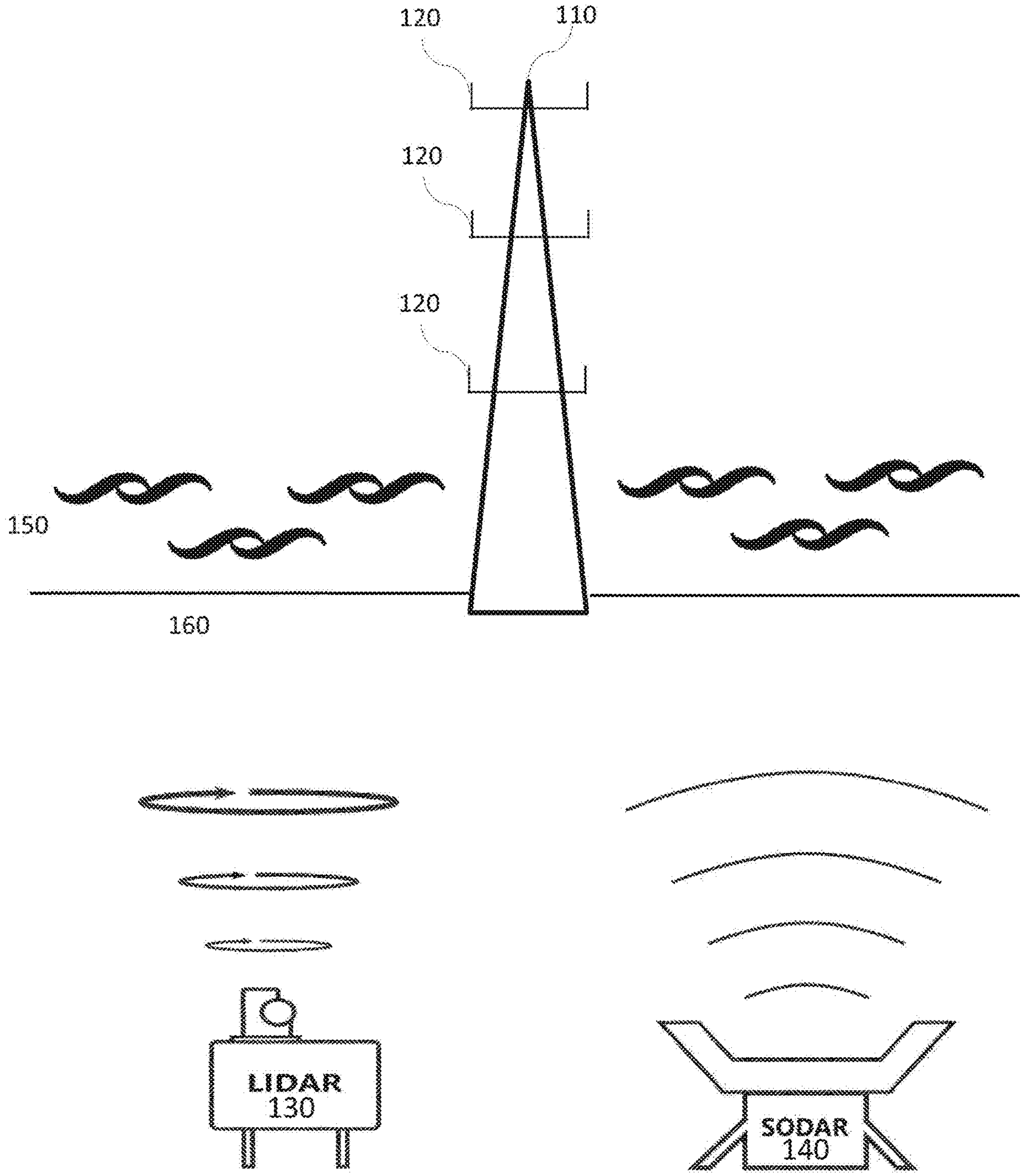
FIG. 1 is a schematic block diagram of a met mast and RS devices in the prior art.
Figure 2:
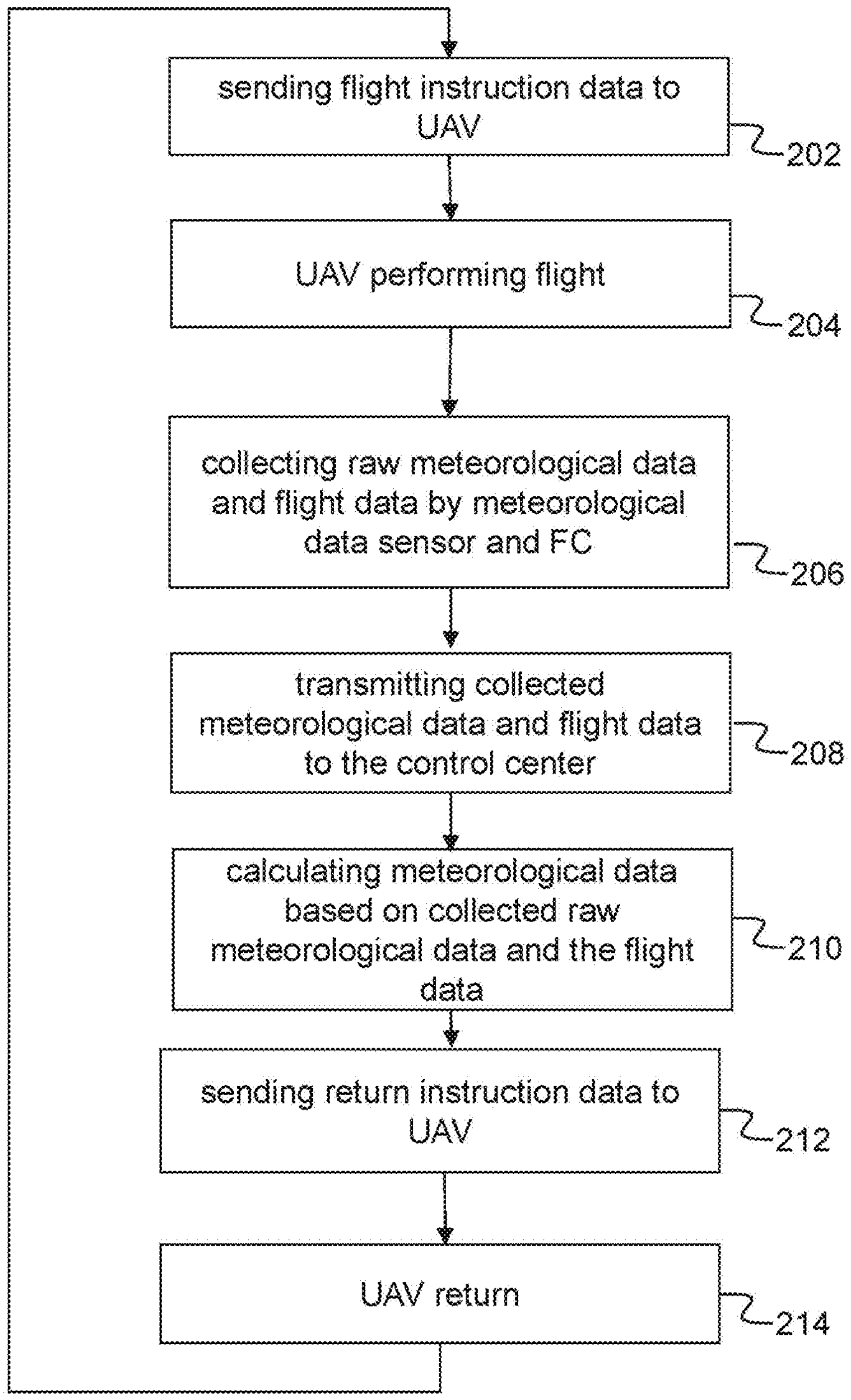
FIG. 2 is a flow chart illustrating a method performed by an unmanned aerial system, UAS, according to possible embodiments.
Figure 3:
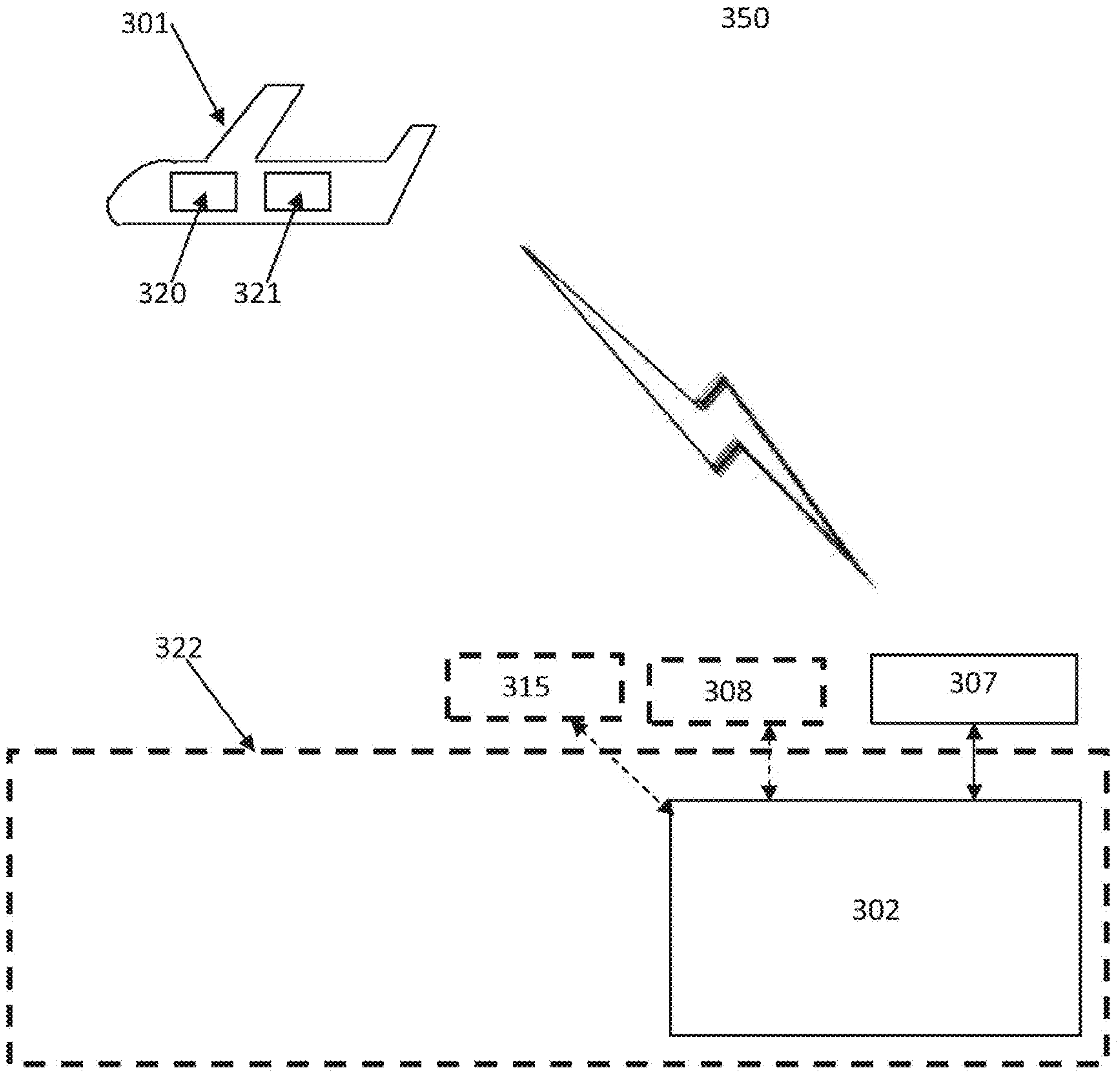
FIG. 3 is a schematic block diagram of the UAS, according to possible embodiments.

FIG. 2, in conjunction of FIG. 3, shows a method performed by an unmanned aerial system, UAS, according to an exemplary embodiment. The method is used for obtaining meteorological data by an unmanned aerial system, UAS 350, 450, the UAS 350, 450 comprises at least one unmanned aerial vehicle, UAV 301, 401, a control center 302, 402 and a wireless communication interface 307, 407. The at least one UAV 301, 401 is equipped with a meteorological data sensor 320 and a flight controller 321, FC and the at least one UAV 301, 401 is configured for wireless communication with the control center 302, 402 via the wireless communication interface 307, 407 during flight. The method comprises sending 202 flight instruction data, from the control center 302, 402 to the at least one UAV 301, 401, instructing the at least one UAV 301, 401 to perform flight. The method further comprises performing 204 flight, by the at least one UAV 301, 401, according to the flight instruction data and collecting 206 raw meteorological data and flight data, by the at least one UAV 301, 401 during the flight, wherein the raw meteorological data is collected by the meteorological data sensor 320 and the flight data is collected by the FC 321, wherein the flight data being collected by any one of a position sensor, a motion sensor, an environment sensor and/or a combination thereof included in the FC 321. The method further comprises transmitting 208, in real time, the collected 206 raw meteorological data and the flight data, from the at least one UAV 301, 401 to the control center 302, 402, during the flight, via the wireless communication interface 307, 407 of the UAS 350, 450 and calculating 210 meteorological data, in the control center 302, 402, based on the received raw meteorological data and the flight data in the transmitting 208 step. The method further comprises sending 212 return instruction data, from the control center 302, 402 to the at least one UAV 301, 401, instructing the at least one UAV 301, 401 to return to the UAS 350, 450 and returning 214 the at least one UAV 301, 401 to the UAS 350, 450, according to the return instruction data.

The at least one UAV 301, 401 can be any kind of UAV which is suitable for flying in a windy environment, e.g., fixed-wing UAV, fixed-wing vertical take-off and landing (VTOL) UAV. The structure of the UAV will be discussed later in this disclosure.

In the step 202, the UAV 301, 401 is instructed by the control center 302, 402 to perform flight on the prospective wind farm or other sites which need to obtain meteorological data. The flight instruction data can comprise the flight schedule, flight direction, flight path, destination information, etc. The UAV 301, 401 performs flight accordingly in step 204.

In the step 206, during the flight, the UAV 301, 401 collects raw meteorological data with the meteorological data sensor 302 installed thereon. The collected raw meteorological data can include e.g., wind speed, wind direction, wind frequency, turbulence intensity, humidity, temperature, atmospheric pressure, aeroallergen concentration, atmospheric aerosols/particulates, pollution, greenhouse gas concentration, which are examples of possible types of meteorological data which are related to wind property and other environmental properties. The meteorological data sensor 302 can be a pitot tube, a hot wire sensor, a laser doppler sensor, an ultrasonic/acoustic sensor, a humidity sensor, a temperature sensor, a gas concentration sensor, an aerosol sensor, etc. and/or combination of any of these sensors. A pitot tube is a flow measurement device used to measure air flow velocity and pressure. For example, the wind speed can be measured and collected by the pitot tube. A hot wire sensor is also called a hot wire mass airflow sensor. For example, the wind speed, wind direction and/or turbulence intensity can be detected by the hot wire sensor. Laser doppler sensors and acoustic sensors use light and sound wave propagation/reflection respectively to measure the changes in the air. Other kinds of sensors and equipment can also be equipped, e.g., a camera, a collision avoidance sensor, an infrared (IR) sensor, etc. The camera can be used to take photos or record videos of the site. A collision avoidance sensor can also be equipped to the UAV 301, 401 so as to avoid any collision with stationary and flying objects, such as birds or other UAV. The collision avoidance sensor can be based on GPS technology and/or Radar, Lidar and/or Sonar principles. An infrared sensor can be used to detect heat signatures and temperature fluctuations. Other types of data can be collected depending on the type of sites and according to different scenarios/applications.

Also in the step 206, during the flight, the UAV 301, 401 collects or measures flight data with the FC 321 provided thereon. The flight data can be real time flight related data of the UAV 301, 401, e.g., the flying speed of the UAV 301, 401, the flying direction, the acceleration, the azimuth and elevation, the height, the position, the GPS data, the magnetic field strength of the environment in which the flight being performed, and other flight related data in three dimensional space. The FC 321 can be equipped with different types of sensors, e.g., position sensors, motion sensors and/or environment sensors, etc. The different sensors can be e.g., a gyroscope, an accelerometer, an inertial measurement unit (IMU), a barometer, a magnetometer, GPS and/or a combination of any of these devices. The position sensors, motion sensors and/or environment sensors equipped on the FC 321 are used to collect real time flight data of the UAV 301, 401.

In the step 208, the collected raw meteorological data and the flight data is transmitted from the UAV 301, 401 to the control center 302, 402 of the UAS 350, 450, in real time. The transmission is performed via the wireless communication interface 307, 407 of the UAS 350, 450. The wireless communication between the UAV 301, 401 and the wireless communication interface 307, 407 can use any suitable radio telecommunication protocol, e.g., 3G, LTE, 5G, UranusLink, Uncomplicated Application-level Vehicular Computing and Networking (UAVCAN), Micro Air Vehicle Link (MAVLink), Ad hoc.

In the step 210, the control center 302, 402 calculates meteorological data based on the received raw meteorological data and the flight data in step 208. The received raw meteorological data and flight data is real time data which represents the current meteorological and flight situation. Since both meteorological data and the flight data are considered, the calculation of the meteorological data is accurate. The calculated meteorological data includes wind property data and other environmental data, e.g., accurate wind speed, wind direction, turbulence intensity, humidity, temperature, pressure, etc. For example, the accurate wind speed is calculated based on the wind speed measured/collected by the meteorological data sensor 320, and the flying speed of the UAV 301, 401 measured/collected by sensors equipped on the FC 321. Since the measured wind speed is actually a relative wind speed in relation to the UAV 301, 401, when considering the speed of the UAV 301, 401, a more accurate wind speed is calculated by the control center 302, 402. Similarly, a more accurate wind direction is calculated when considering the azimuth, inclination, and elevation of the UAV 301, 401. To be specific, the UAV 301, 401 may perform flight in an angle or in a direction which is not parallel to the horizontal surface. This real-time flying direction/angle is measured/collected by the FC 321. When measuring the wind direction/angle with the meteorological data sensor 302, the measured wind direction/angle is actually the relative direction/angle to the UAV 301, 401. Thus, the measured wind direction/angle is not the "real" or accurate wind direction/angle relative to the horizontal surface. In this situation, when a "real" or accurate wind direction/angle is calculated, both the measured wind direction/angle and the UAV 301, 401 flying direction/angle should be considered in calculation. Therefore, the meteorological data is calculated based on both raw meteorological data and collected flight data. As for the calculation of turbulence intensity, turbulence intensity is the ratio of standard deviation of wind speed to the mean wind speed. On one hand, when the meteorological sensor 302 measures/collects wind speed at a high frequency, more raw wind speed data points are recorded. On the other hand, when the UAV 301, 401 is flying, a changing wind speed can affect the UAV flying status by exerting a varying force to the UAV body. The accelerometer(s) equipped on the FC 321 can measure these small changes. By combining the raw wind speed data points measured by the meteorological 302 and the acceleration data measured/collected by the accelerometer(s) equipped on the FC 321, the calculation of the turbulence intensity becomes more accurate. Additionally, machine learning tools/methods can be used in and enhance such calculation. Therefore, an accurate turbulence intensity can be calculated using a high frequency of recordings from the meteorological sensor 302 and from the FC 321. The calculation 210 is performed by a preinstalled software or predefined algorithm in the control center 302, 402.

In the steps 212 and 214, the UAV 301, 401 returns to the stationary part of the UAS 350, 450 in response to a return instruction data from the control center 302, 402. Thus, the mission of the UAV 301, 401 is accomplished.

Comparing with met masts and RS devices in prior art, the measurement of the meteorological data is done at the precisely intended measurement locations, whereas met masts and RS devices widely use mathematical extrapolation or approximation for wind characterization. Therefore, the disclosed embodiment can greatly reduce the measurement uncertainty for meteorological data. Furthermore, the real time flight data of the at least one UAV 301, 401 is taken into account when calculating the meteorological data. Thus, by such a method, the calculated meteorological data is much more accurate.

According to an embodiment, the step of calculating 210 meteorological data comprises calculating wind speed and the method further comprises sending return instruction data, from the control center 302, 402 to the at least one UAV 301, 401, instructing the at least one UAV 301, 401 to return to the UAS 350, 450 when the calculated 210 wind speed exceeds a wind speed threshold.

Considering the prospective wind farm scenario, modern wind turbines shut down at a wind speed of 25 m/s due to safety reasons. Meanwhile, the UAV 301, 401 may withstand winds of up to 30 m/s based on its size, weight and design. A higher wind speed may damage the UAV 301, 401. Thus, the threshold can be 25 m/s-30 m/s in the wind farm scenario. The speed threshold can be other numbers in other scenarios, for example, the speed threshold can be lower when the wind is not so strong on-site. When the windstorm has passed, the UAV 301, 401 can perform flight again in response to the flight instruction data.

According to an embodiment, the flight instruction data sent 202 to the at least one UAV 301, 401 comprises flight path for each of the at least one UAV 301, 401, wherein the method further comprises transmitting, in real time an energy status of each of the at least one UAV 301, 401, from the at least one UAV 301, 401 to the control center 302, 402, during the flight, via the wireless communication interface 307, 407 of the UAS 350, 450. The method further comprises calculating, in the control center 302, 402, an updated flight path for each of the at least one UAV 301, 401 based on the collected raw meteorological data, the flight data and the energy status of the at least one UAV 301, 401 and sending, updated flight instruction data, from the control center 302, 402 to the at least one UAV 301, 401 in flight, updating the flight path of the at least one UAV 301, 401.

The UAV 301, 401 can be powered by batteries. When the UAV 301, 401 is stored in the UAS 350, 450, it will be charged by the charging station in the UAS 350, 450. The UAV 301, 401 can also be equipped with a portable fuel tank for emergency situations during flight. For example, if one of the UAV motors can be run on both electricity from the batteries and fuel from the fuel tank, in case the UAV 301, 401 is caught in very strong winds or the battery electricity is not sufficient to return the UAV 301, 401 back to the UAS 350, 450, the motor can use the fuel from the fuel tank for a short period until the UAV 301, 401 is returned safely. Furthermore, the UAV 301, 401 can also be retrofitted with light-weighted solar panels on wings to directly charge the onboard batteries during flight to extend the flight time.

The UAV 301, 401 performs flight according to the flight path contained in the received flight instruction data. The UAV 301, 401 can monitor its own energy status and send the energy status to the control center 302, 402 in real time wirelessly. The control center 302, 402 monitors the status of the flying UAV 301, 401 by checking the meteorological data, the flight data, the energy status, and any other necessary environmental data required with respect to measurement's main purpose. An updated flight path for the UAV 301, 401 is calculated based on the meteorological data, the flight data and the energy status. For example, according to updated flight path, the UAV 301, 401 is required to perform an altitude change, destination change, or is required to maintain its position in the air or is required to circulate a certain spot for a period or is required to perform any other specific maneuver for the purpose of data surveying, environmental, or safety reasons. The updated flight path is sent to the UAV 301, 401 during the flight and the UAV 301, 401 will perform its flight according to the updated flight path in real time. The calculation of the flight path is performed in the control center 302, 402. In one embodiment, the control center 302, 402 will calculate the prominent wind speed and wind direction based on the received sensor measurements and UAV 301, 401 flight data. The control center 302, 402 will then decide on the outermost distance that the UAV 301, 401 can have from the UAS 350, 450 in order to stay above a minimum required energy status until the UAV 301, 401 can safely return to the UAS 350, 450. This is because flying against the wind will faster drain energy from the UAV 301, 401. If the return path of the UAV 301, 401 to the UAS 350, 450 has the same general direction as to the prominent wind, this distance will be longer, whereas if the return path is the opposite of the prominent wind, this distance will be shorter. The control center 302, 402 will then send corrective updates to the flight path, instructing the UAV 301, 401 to always stay within this allowed distance. In another embodiment, the meteorological sensor shows a freezing temperature at the UAV 301, 401. In the control center 302, 402, according to measured wind speed, temperature and humidity, a calculation will be made that predicts how long time it will take for the UAV 301, 401 propellers and/or wings to experience what is referred to as icing. Icing is the formation of ice particles on an aerofoil, such as wings and rotating blades. Icing reduces flight effectiveness. The control center 302, 402, thereafter, will send updated flight instructions to the UAV 301, 401 in order to prevent icing. These updated instructions can either be decreasing the flight speed, changing the flight direction, turning on the onboard blade heaters, returning to the UAS 350, 450, etc. or any other combination of these. In another embodiment, the control center 302, 402, at predefined intervals, will send updated coordinates and flight height for the return path to the UAS 350, 450 in case the data transmission signal is temporarily lost. In another embodiment, the control center 302, 402 will send updated flight path to the UAV in case a flock of birds is passing nearby, so that the UAV 301, 401 can maintain a safe distance from the animals without disrupting their movement or scaring them. In another embodiment, the allowed flight ceiling and allowed flight area is communicated to the UAV 301, 401 based on the most recent local flight restrictions. In another embodiment, when the wind speed is lower than a certain threshold, and the energy status of the UAV 301, 401 is higher than a certain threshold, an updated instruction to prolong the flight path may be initiated and sent to the UAV 301, 401.

By this method, a real time updating of the UAV 301, 401 flight path is achieved. The real time updating of the flight path takes many factors into account, and an optimal flight path can be calculated in real time. The optimal flight path can maintain the most effective coverage of the surveyed area. The calculation is performed by the control center 302, 402, and different machine learning methods can be used to perform/enhance the calculation.

According to another embodiment, more than one UAV 301, 401 are used, so that these UAVs 401 can take turns to perform flight and measurements to guarantee continuous working of the UAS 350, 450 so that the UAS 350, 450 is always under operation. The working schedule of all the UAVs 301, 401 are controlled by the control center 302, 402, so that all the UAVs 301, 401 are properly working, and effectively alternating between stand-by mode, charging mode, and flight mode. In case of malfunction or any unexpected interruptions to one of the UAVs 301, 401, the control center 302, 402 will give instructions to stand-by UAVs to perform flight and measurements. The collected meteorological data, the flight data, the energy status of UAVs 301, 401, e.g., positions of all the UAVs 301, 401, heights, flight speeds, flight direction, wind speed, wind direction, battery level, etc. are used by the control center 302, 402 to schedule the whole UAS 350, 450, so that there is always at least one UAV 301, 401 which performs flight and measurement.

According to an embodiment, the UAS 350, 450 further comprises a tethered meteorological data sensor 308, 408, which is arranged to collect raw meteorological data at different heights, and wherein the method further comprises transmitting the raw meteorological data collected by the tethered meteorological data sensor 308, 408 to the control center 302, 402.

The tethered meteorological data sensor 308, 408 can be located on a tethered balloon, a tethered blimp or a tethered UAV which is either fixed winged, multi-rotor, or any hybrid combination of the previously mentioned. The tethered meteorological data sensor 308, 408 can also be other forms which are tethered to the UAS 305, 450 on one end with a winch or other connecting apparatus. The tethered meteorological data sensor 308, 408 is similar to the meteorological data sensor 320, which is equipped on the UAV 301, 401 and can collect possible types of meteorological and environmental data, e.g., wind speed, wind direction, wind frequency, turbulence intensity, humidity, temperature, atmospheric pressure, aeroallergen concentration, atmospheric aerosols/particulates, pollution, greenhouse gas concentration, etc. Since the length of the tether is adjustable, the tethered meteorological data sensor 308, 408 can collect meteorological data at different heights in long term or short term. The meteorological data collected by the tethered meteorological data sensor 308, 408 is transmitted to the control center 302, 402 and the control center 302, 402 calculates meteorological data also based on the raw meteorological data collected by the tethered meteorological data sensor 308, 408.

According to an embodiment, the UAS 350, 450 further comprises a fixed meteorological data sensor 315, 415, which is arranged to collect raw meteorological data at the UAS 350, 450, and wherein the method further comprises transmitting the raw meteorological data collected by the fixed meteorological data sensor 315, 415 to the control center 302, 402.

The fixed meteorological data sensor 315, 415 has similar functions as the meteorological data sensor 320, which is equipped on the UAV 301, 401 and can collect possible types of meteorological data, e.g., wind speed, wind direction, wind frequency, turbulence intensity, humidity, temperature, atmospheric pressure, aeroallergen concentration, atmospheric aerosols/particulates, pollution, greenhouse gas concentration, etc. The meteorological data collected by the fixed meteorological data sensor 315, 415 is transmitted to the control center 302, 402 and the control center 302, 402 calculates meteorological data also based on the raw meteorological data collected by the fixed meteorological data sensor 315, 415. One advantage of the fixed meteorological data sensor 315, 415 is that the fixed meteorological data sensor 315, 415 keeps on working even in an extreme environment. For example, during a windstorm or a thunderstorm, the UAV 301, 401 is instructed to return to the UAS 350, 450 and cannot continue performing the measurement, but the fixed meteorological data sensor 315, 415 can still measure and transmit meteorological data to the control center 302, 402.

FIG. 3, in conjunction with FIG. 2, 4-6, discloses a UAS 350, 450, for obtaining meteorological data. The UAS 350, 450 comprises at least one unmanned aerial vehicle, UAV 301, 401, a control center 302, 402 and a wireless communication interface 307, 407. The at least one UAV 301, 401 is equipped with at least one meteorological data sensor 320 and a flight controller, FC 321. The at least one UAV 301, 401 is arranged for wireless communication with the control center 302, 402 via the wireless communication interface 307, 407 during flight. The control center 302, 402 and the FC 321 of the at least one UAV 301, 401 comprise instructions which when executed cause the system to send flight instruction data, from the control center 302, 402 to the at least one UAV 301, 401, instructing the at least one UAV 301, 401 to perform flight. The system is further caused to perform flight, by the at least one UAV 301, 401, according to the flight instruction data and collect meteorological data and flight data, by the at least one UAV 301, 401 during the flight, wherein the raw meteorological data is collected by the meteorological data sensor 320, and the flight data is collected by the FC 321, wherein the flight data being collected by any one of a position sensor, a motion sensor, an environment sensor and/or a combination thereof included in the FC 321. The system is further caused to transmit, in real time, the collected raw meteorological data and the flight data, from the at least one UAV 301, 401 to the control center 302, 402, during the flight, via the wireless communication interface 307, 407 of the UAS 350, 450 and calculate meteorological data, in the control center 302, 402, based on the received raw meteorological data and the flight data. The system is further caused to send return instruction data, from the control center 302, 402 to the at least one UAV 301, 401, instructing the at least one UAV 301, 401 to return to the UAS 350, 450 and return the at least one UAV 301, 401 to the UAS 350, 450, according to the return instruction data.

According to an embodiment, the calculating of meteorological data comprises calculating wind speed and the control center 302, 402 is further caused to send return instruction data, from the control center 302, 402 to the at least one UAV 301, 401, instructing the at least one UAV 301, 401 to return to the UAS 350, 450, when the calculated wind speed exceeds a wind speed threshold.

According to another embodiment, the flight instruction data sent to the at least one UAV 301, 401 comprises flight path for each of the at least one UAV 301, 401, the at least one UAV 301, 401 is further caused to transmit, in real time, an energy status of each of the at least one UAV 301, 401, from the at least one UAV 301, 401 to the control center 302, 402, during the flight, via the wireless communication interface 307, 407 of the UAS 350, 450. The control center

302, 402 is further caused to calculate an updated flight path for each of the at least one UAV 301, 401 based on the collected raw meteorological data, the flight data and the energy status of the at least one UAV 301, 401 and to send updated flight instruction data, from the control center 302, 402 to the at least one UAV 301, 401 in flight, updating the flight path of the at least one UAV 301, 401.

According to another embodiment, the UAS 350, 450 further comprises a tethered meteorological data sensor 308, 408, which is arranged to collect raw meteorological data at different heights, and the tethered meteorological data sensor 308, 408 is caused to transmit raw meteorological data collected by the tethered meteorological data sensor 308, 408 to the control center 302, 402.

According to another embodiment, the UAS 350, 450 further comprises a fixed meteorological data sensor 315, 415, which is arranged to collect raw meteorological data at the UAS 350, 450, and the fixed metrological data sensor 315, 415 is caused to transmit the raw meteorological data obtained by the fixed meteorological data sensor 315, 415 to the control center 302, 402.

According to another embodiment, the at least one UAV 301, 401 is a fixed-wing UAV, preferably a fixed-wing vertical take-off and landing UAV.

The UAV 301, 401 used for collecting meteorological data should be suitable for the environment, for example, windy, humid, unstable. The suitable type for UAV 301, 401 is fixed-wing UAV, preferably fixed-wing VTOL UAV. A typical fixed-wing UAV resembles an airplane and has no vertical axis motors. A fixed-wing VTOL UAV is a hybrid of ordinary fixed-wing UAV and multi-rotors. The multi-rotors resemble helicopters, so that the fixed-wing VTOL UAV resembles a combination of airplane and helicopter. A typical fixed-wing VTOL UAV can have four vertical axis motors, which gives it the ability to take off, hover, and land vertically. They also help to maintain the position of the fixed-wing VTOL UAV in the air, that is keeping hovering without moving. Since the UAV is working in a windy environment, such function is beneficial. The number of vertical axis motors can be more than four, e.g., six or eight.

Furthermore, the UAV 301, 401 may also comprise one or more horizontal axis motors. A horizontal axis motor helps the UAV 301, 401 to move forward. There are different arrangements for horizontal and vertical axis motors for the UAV 301, 401. For example, one horizontal axis motor is used either in the back or front of the UAV 301, 401; two horizontal axis motors are used, one for each wing; three horizontal axis motors are used, one in back or front, two on wings; no horizontal axis motor is used, only vertical axis motors. Other ways of combining horizontal axis motor and vertical axis motor can also be applied.

For the fixed-wing VTOL UAV, it can have at least two flight modes. The first flight mode is to fly like an airplane and the second flight mode is to fly like a helicopter. A mixed flight mode where the UAV is using all its motors can also be possible. By using the vertical axis motors, the UAV can take off and land vertically, or hover while maintaining position, like a helicopter. This flight mode is also useful when the UAV is needed to stay in a position and maintain stationary measurements. By using the horizontal axis motors, the UAV can cruise at high speeds like an airplane. Most measurements can be taken in this mode. The UAV can simultaneously record measurements while flying at high speeds in a large area.

Since a prospective wind farm and other sites which need meteorological data measurements are usually prone to strong winds, there is a need for the working UAV to fly effectively with lower power for an extended duration. Since a fixed-wing structure provides long flight duration up to several hours and the VTOL structure provides maneuverability and vertical take-off/land/hover function, the fixed-wing VTOL UAV alternative provides long flight time, good maneuverability, as well as easy take-off and landing. Meanwhile, by maintaining a suitable size to weight ratio and strong UAV frame and stronger motors, the fixed-wing VTOL UAV can withstand harsher wind conditions and can be a good option to UAV 301, 401. Other kinds of UAV are also applicable.

According to another embodiment, the UAS 350, 450 is retractably contained in a container 322, 422.

Since the UAS 350, 450 can be utilized on different sites, it needs to be easily transportable. A container 322, 422 is provided for an easy transportation. The container 322, 422 can be a shipping container or any other frame structure to contain the whole UAS 350, 450 retractably. When the UAS 350, 450 is not working, the UAS 350, 450 can be packed into the container 322, 422 and being placed on land or transported by a truck or a boat.

Figure 4:
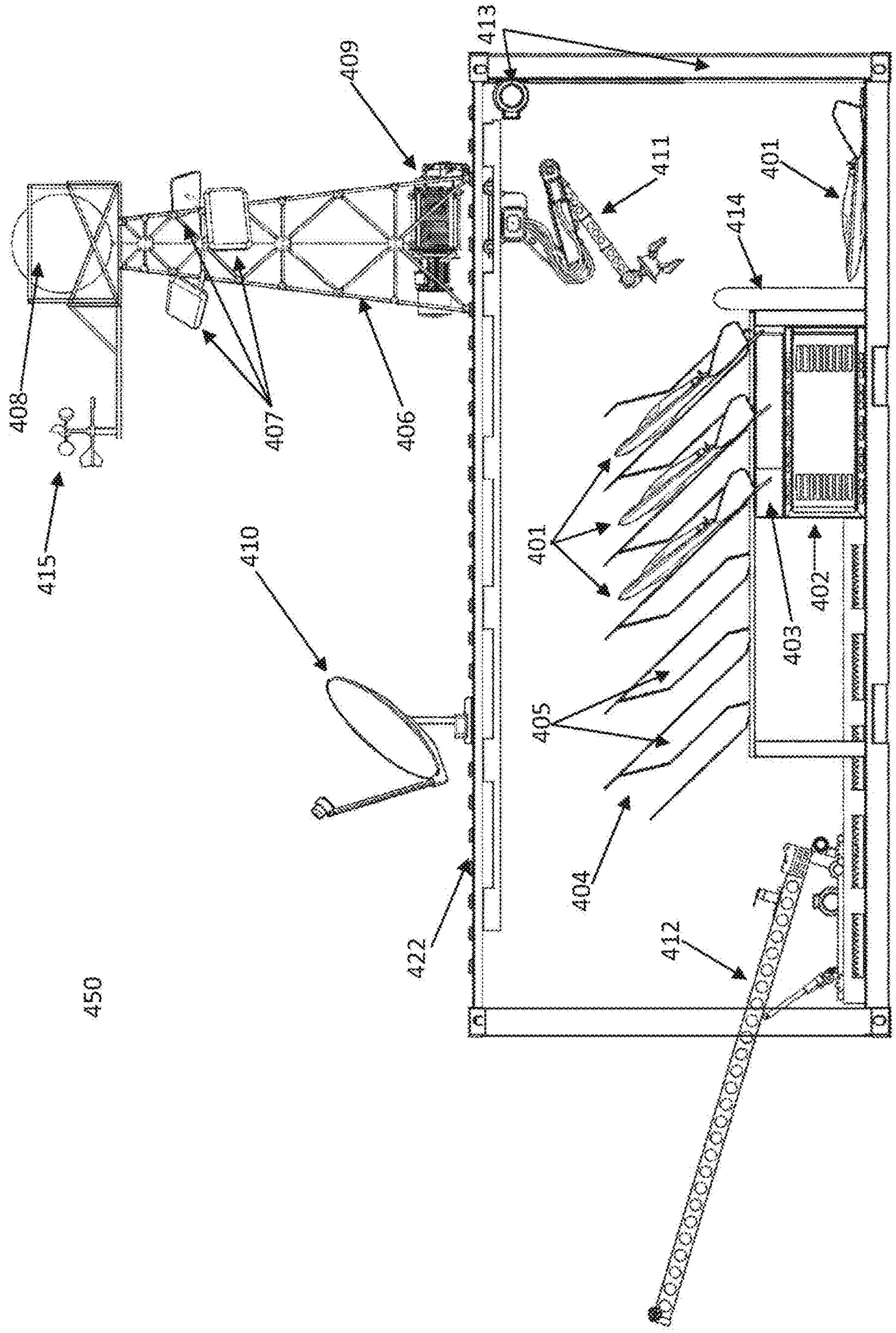
FIG. 4 is a schematic block diagram of the UAS, according to possible embodiments.
Figure 5:
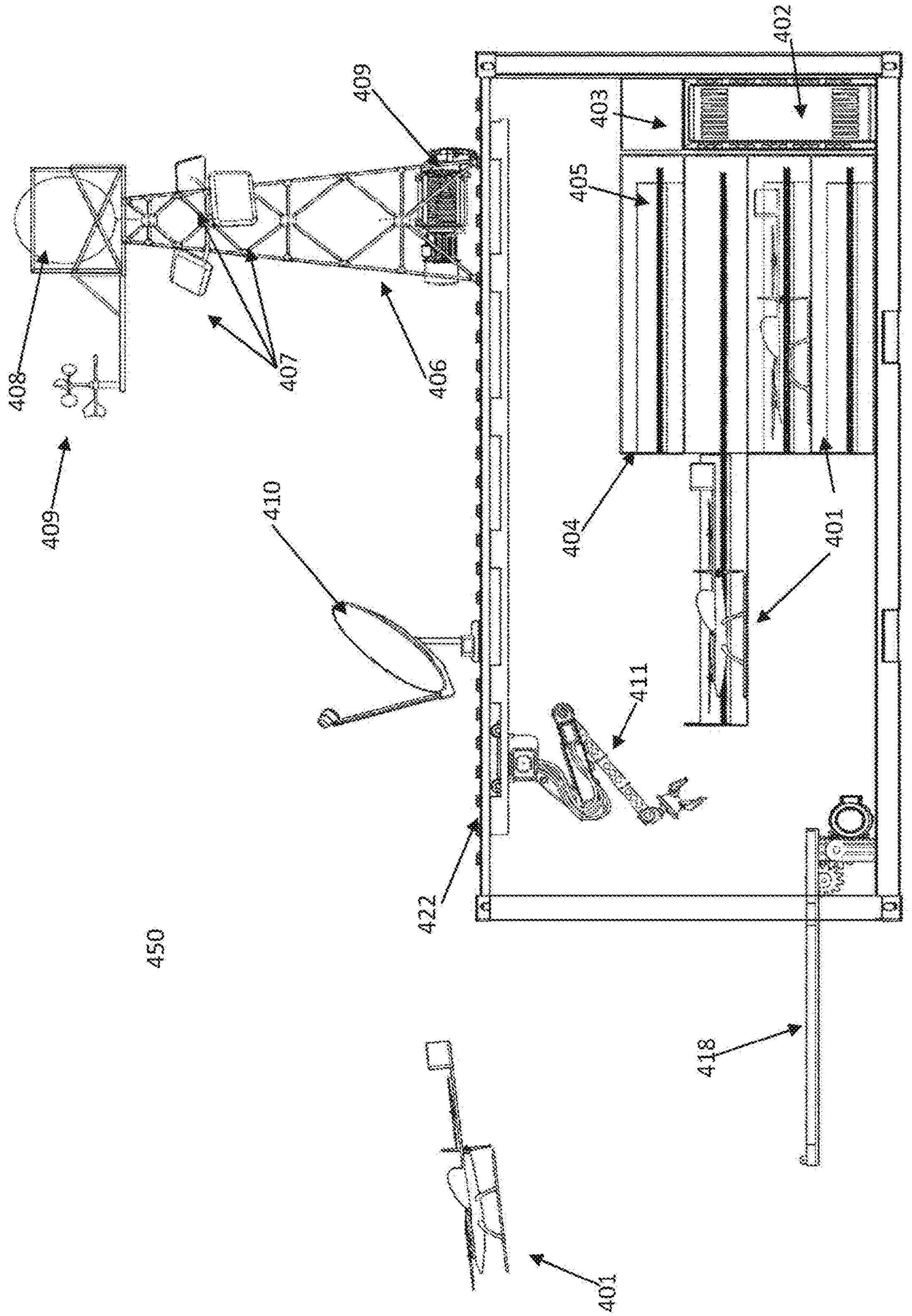
FIG. 5 is a schematic block diagram of the UAS, according to possible embodiments.
Figure 6:
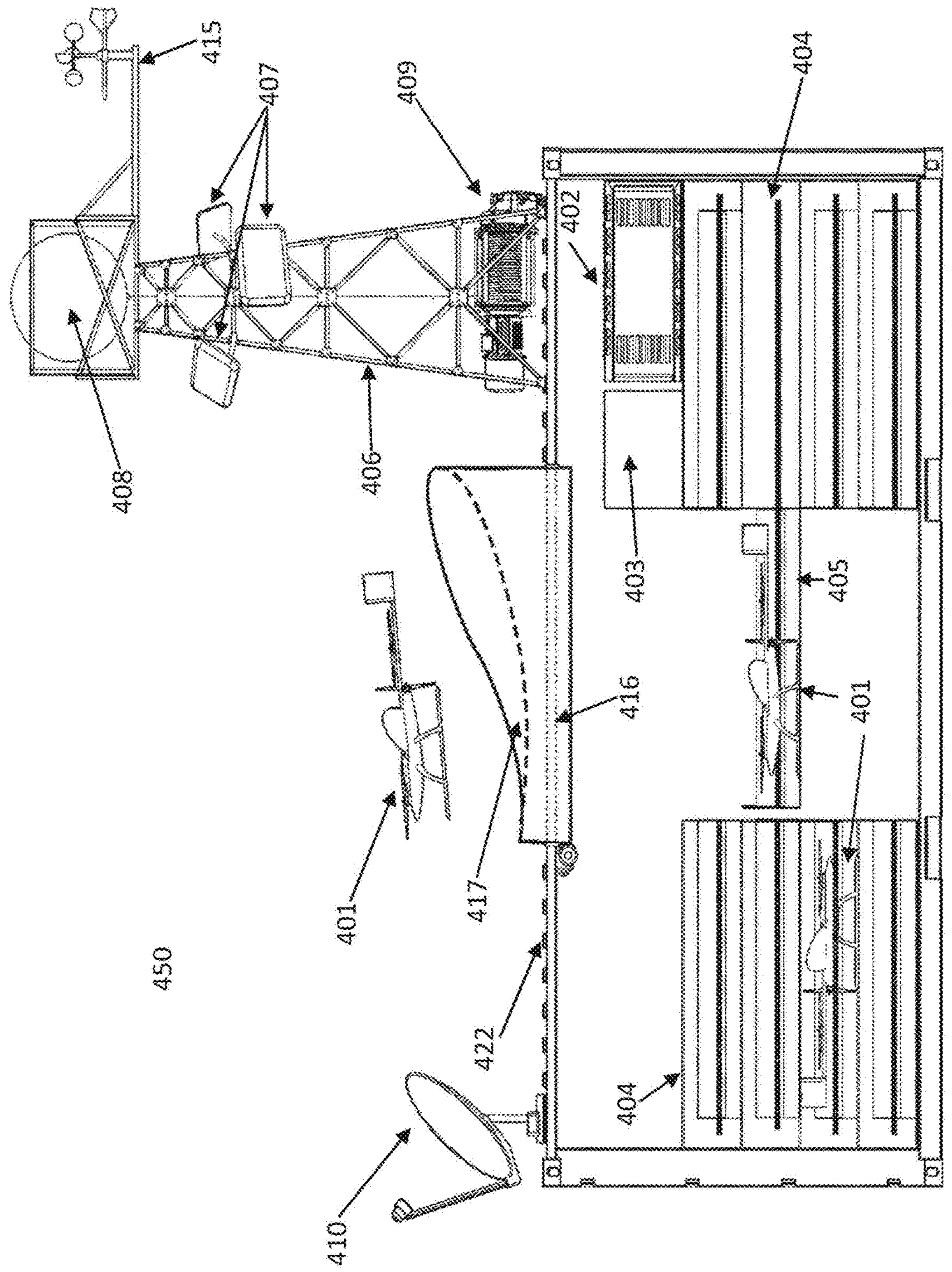
FIG. 6 is a schematic block diagram of the UAS, according to possible embodiments.

FIGS. 4, 5 and 6 are schematic block diagrams for the UAS 450. The UAS comprises at least one UAV 401, a control center 402, a wireless communication interface 407. In FIG. 4, three UAVs 401 are shown, and they are staying in the UAS 450. In FIGS. 5 and 6, one UAV is performing flight and the other UAVs are staying in the UAS 450. The control center 402 can be a computer, or any device which has sufficient calculation capacity. The wireless communication interface 407 is installed outside so that the UAVs can easily communicate wirelessly. A data connection is provided between the wireless communication interface 407 and the control center 402 so that the data received by the wireless communication interface 407 can be sent to the control center 402 for calculation.

Besides, according to another embodiment, the at least one UAV 401, the control center 402, the wireless communication interface 407, the UAS 450 further comprises UAV racks/drawers 404 and UAV fast charging stations 405. FIGS. 4, 5, 6 show different arrangements and structures of the UAV racks/drawers 404 and the UAV fast charging stations 405. The UAV fast charging stations 405 are installed onto the UAV racks/drawers 404 so that when the UAV 401 returns to the UAS 450, the UAV 401 is stored on the UAV racks/drawers 404 and being charged by the UAV fast charging station 405. Each UAV 401 is provided with at least one UAV rack/drawer 404 and one UAV fast charging station 405. Each UAV racks/drawer 404 can be stationary or mobile, retractable or non-retractable. Each UAV 401 can land on or take off from a retractable UAV rack/drawer 404. The UAS 350 is connected to an external power supply so that the UAV fast charging stations 405, the control center 402 and other components which need power can work. The external power supply can be electricity grid and/or stand-alone power source. An emergency electricity storage system 403 is also provided so that the components in the UAS 350 can continue to work if the external power supply is cut off.

FIGS. 4-6 also show a communication tower 406, a tethered meteorological data sensor 408, a fixed meteorological data sensor 415 and a tethering system 409 for the tethered meteorological data sensor 408. The communication tower 406 can be a steel structure tower that is at least two meters high. Other forms of the communication tower structure are also possible. The wireless communication interface 407, the tethered meteorological data sensor 408, the fixed meteorological data sensor 415 and the tethering system 409 can be equipped on the communication tower 406. In the embodiments shown in FIGS. 4-6, the tethered meteorological data sensor 408 is a balloon. As stated above, the tethered meteorological data sensor 408 can have other forms. The fixed meteorological data sensor 415 is an anemometer in the FIGS. 4-6, however, it can be other forms of meteorological data sensor. The tethering system 409 is used for fixing the tethered meteorological data sensor 408 and control the height of the tethered meteorological data sensor 408. The tethering system 409 can be a winch/cable/wire arrangement or other similar setups.

The UAS 450 further comprise an external communication device 410 which is used to wirelessly communicate with an external apparatus, e.g., a server or an external control center. The external apparatus can send remote instructions to the control center 402 of the UAS 450 via the external communication device 410. Meanwhile, the control center 402 can send data packages to remote users via the external communication device 410. The sent data packages can be calculated meteorological data and other environmental data, or raw data collected by the at least one UAV 401, raw data collected by the tethered meteorological data sensor 408, or raw data collected by the fixed meteorological data sensor 415.

A robotic arm 411, a UAV catapult 412 and a runway 413 and a damper mat 414 are also comprised in the UAS 450 in the embodiment shown in FIG. 4. The robotic arm 411 is a mechanical arm used to pick up, move and place a UAV 401 from the UAV racks/drawer 404 to the UAV catapult 412 or vice versa. The robotic arm 411 is also used to pick up, move and place a UAV 401 from the runway 413 to the UAV racks/drawer 404 or vice versa. The robotic arm 411 can move along three axes to reach different parts of the UAS 450. The UAV catapult 412 is used to launch the UAV 401 when it begins to perform flight and can also be other types of UAV launching mechanisms. The runway 413 shown here is retracted. The runway 413 is used to receive the UAV 401 when they return and land. The runway 413 can be stationary, mobile, retractable or non-retractable, and can be equipped with retractable runway doors or openings. The damper mat 414 is used to reduce vibration to the whole UAS 450, especially the vibration of the control center 402, as well as to prevent damage to the returning/landing UAVs. The UAV 401 in FIG. 4 is fixed wing UAV, non-VTOL.

Referring to the embodiment shown in FIG. 5, a take-off & landing area 418 is shown. The robotic arm 411 is used to pick up, move and place a UAV 401 from the UAV racks/drawer 404 to the take-off & landing area 418 or vice versa. The take-off & landing area 418 can be stationary or mobile, retractable or non-retractable, and can be equipped with retractable doors or openings.

Referring to the embodiment shown in FIG. 6, a retractable entry/exit 417 and a rotating take-off/landing shield 416 is shown. The rotating take-off/landing shield 416 is used for shielding the UAV from wind fluctuations/gusts in order to facilitate easier and safer take-off and landing.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." Further, the term "a number of", such as in "a number of wireless devices" signifies one or more devices. All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method for obtaining meteorological data by an unmanned aerial system (UAS), the method comprising:

sending flight instruction data, from a control center to at least one unmanned aerial vehicle (UAV), instructing the at least one UAV to perform flight;

performing flight, by the at least one UAV, according to flight instruction data;

collecting raw meteorological data and flight data, by the at least one UAV during the flight, wherein the raw meteorological data is collected by a meteorological data sensor and the flight data is collected by a flight controller (FC), wherein the flight data comprises real time flight related data of the at least one UAV and the flight data being collected by at least one of a position sensor, a motion sensor, or an environment sensor included in the FC;

transmitting in real time, the collected raw meteorological data and the flight data, from the at least one UAV to the control center, during the flight, via the wireless communication interface of the UAS;

calculating meteorological data, in the control center, based on the received raw meteorological data and the flight data in the transmitting step;

sending return instruction data, from the control center to the at least one UAV;

instructing the at least one UAV to return to the control center; and returning the at least one UAV to the control center, according to the return instruction data.

2. The method as claimed in claim 1, wherein the step of calculating meteorological data comprises calculating wind speed and the method further comprises:

instructing the at least one UAV to return to the control center when the calculated wind speed exceeds a wind speed threshold.

3. The method as claimed in claim 1, wherein the flight instruction data sent to the at least one UAV comprises flight path for each of the at least one UAV, wherein the method further comprises:

transmitting, in real time an energy status of each of the at least one UAV, from the at least one UAV to the control center, during the flight, via the wireless communication interface of the UAS;

calculating, in the control center, an updated flight path for each of the at least one UAV based on the collected raw meteorological data, the flight data and the energy status of the at least one UAV;

sending, updated flight instruction data, from the control center to the at least one UAV in flight; and updating the flight path of the at least one UAV.

4. The method as claimed in claim 1, wherein the UAS further comprises a tethered meteorological data sensor, which is arranged to collect raw meteorological data at different heights, and wherein the method further comprises transmitting the raw meteorological data collected by the tethered meteorological data sensor to the control center.

5. The method as claimed in claim 1, wherein the UAS further comprises a fixed meteorological data sensor, which is arranged to collect raw meteorological data at the UAS, and wherein the method further comprises transmitting the raw meteorological data collected by the fixed meteorological data sensor to the control center.

6. An unmanned aerial system (UAS), for obtaining meteorological data, the UAS comprising:

at least one unmanned aerial vehicle (UAV);

a control center; and a wireless communication interface, the at least one UAV being equipped with at least one meteorological data sensor and a flight controller (FC), the at least one UAV being arranged for wireless communication with the control center via the wireless communication interface, during flight, the control center and the FC of the at least one UAV are configured to:

send flight instruction data, from the control center to the at least one UAV, instructing the at least one UAV to perform flight;

perform flight, by the at least one UAV, according to the flight instruction data;

collect raw meteorological data and flight data, by the at least one UAV during the flight, wherein the raw meteorological data is collected by the meteorological data sensor, and the flight data is collected by the FC, wherein the flight data comprises real time flight related data of the at least one UAV and the flight data being collected by at least one of a position sensor, a motion sensor, or an environment sensor in the FC;

transmit, in real time, the collected raw meteorological data and the flight data, from the at least one UAV to the control center, during the flight, via the wireless communication interface of the UAS;

calculate meteorological data, in the control center, based on the received raw meteorological data and the flight data;

send return instruction data, from the control center to the at least one UAV;

instruct the at least one UAV to return to the control center; and return the at least one UAV to the control center, according to the return instruction data.

7. The UAS as claimed in claim 6, wherein calculating meteorological data comprises calculating wind speed and the control center is further caused to:

instruct the at least one UAV to return to the control center, when the calculated wind speed exceeds a wind speed threshold.

8. The UAS as claimed in claim 6, wherein the flight instruction data sent to the at least one UAV comprises flight path for each of the at least one UAV, the at least one UAV is further caused to transmit, in real time, an energy status of each of the at least one UAV, from the at least one UAV to the control center, during the flight, via the wireless communication interface of the UAS, and wherein the control center is further caused to:

calculate an updated flight path for each of the at least one UAV based on the collected raw meteorological data, the flight data and the energy status of the at least one UAV;

send updated flight instruction data, from the control center to the at least one UAV in flight, and update the flight path of the at least one UAV.

9. The UAS as claimed in claim 6, wherein the UAS further comprises a tethered meteorological data sensor, which is arranged to collect raw meteorological data at different heights, and the tethered meteorological data sensor is caused to transmit the raw meteorological data collected by the tethered meteorological data sensor to the control center.

10. The UAS as claimed in claim 6, wherein the UAS further comprises a fixed meteorological data sensor, which is arranged to collect raw meteorological data at the UAS, and the fixed metrological data sensor is caused to transmit the raw meteorological data collected by the fixed meteorological data sensor to the control center.

11. The UAS as claimed in claim 6, wherein the at least one UAV is a fixed-wing UAV, preferably a fixed-wing vertical take-off and landing (VTOL) UAV.

12. The UAS as claimed in claim 6, wherein the UAS is retractably contained in a container.

* * * * *